United States Patent [19]

Niwayama

[11] Patent Number: 5,170,333
[45] Date of Patent: Dec. 8, 1992

[54] SWITCHING REGULATOR OPERATING IN A CONTINUOUS AND DISCONTINUOUS MODE

[75] Inventor: Masaki Niwayama, Sanda, Japan

[73] Assignee: Mitsubishi Denki Kabushiki Kaisha, Tokyo, Japan

[21] Appl. No.: 789,692

[22] Filed: Nov. 8, 1991

[30] Foreign Application Priority Data

Nov. 9, 1990 [JP] Japan .................................. 2-302777

[51] Int. Cl.⁵ .................... H02M 3/335; H02M 3/156
[52] U.S. Cl. ..................................... 363/21; 323/222; 323/285; 323/288
[58] Field of Search ............... 323/222, 283, 285, 286, 323/288; 363/21

[56] References Cited

U.S. PATENT DOCUMENTS

| | | | |
|---|---|---|---|
| 4,688,158 | 8/1987 | Peterson et al. ...................... | 363/21 |
| 4,739,234 | 4/1988 | Nolan et al. ........................... | 363/84 |
| 4,884,183 | 11/1989 | Sable ...................................... | 363/41 |

*Primary Examiner*—William H. Beha, Jr.
*Attorney, Agent, or Firm*—Sughrue, Mion, Zinn, Macpeak and Seas

[57] ABSTRACT

A switching regulator operates either in the discontinuous mode or in the continuous mode depending on the magnitude of a load current. A mode detector outputs a mode signal Vg indicative of whether the switching regulator is operating in the discontinuous mode or in the continuous mode. In accordance with the mode signal Vg, an error amplifier selectively operates with a first feedback ratio or a second feedback ratio so as to output an error signal Ver indicative of the variation of an output voltage of the regulator. The error signal Ver is then supplied to a PWM (pulse-width modulation) comparator which in turn outputs a PWM signal in accordance with the error signal. The PWM signal drives a switching transistor to switch an input voltage of the switching regulator.

7 Claims, 12 Drawing Sheets

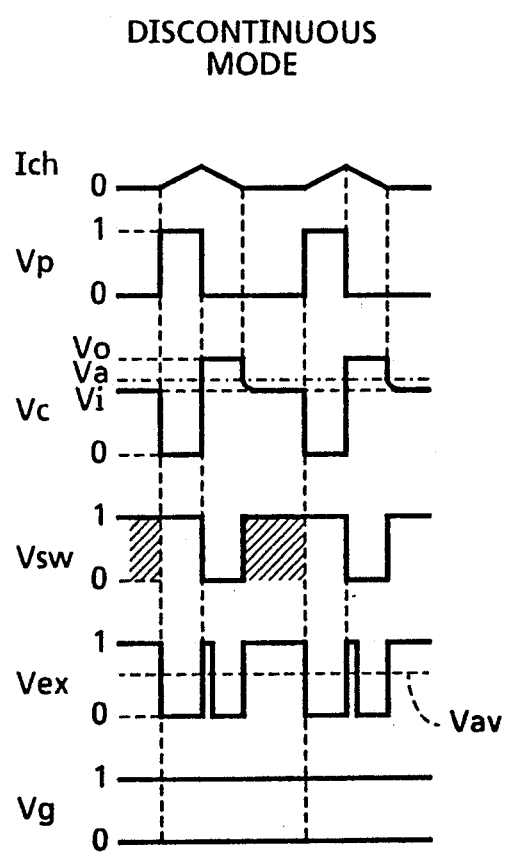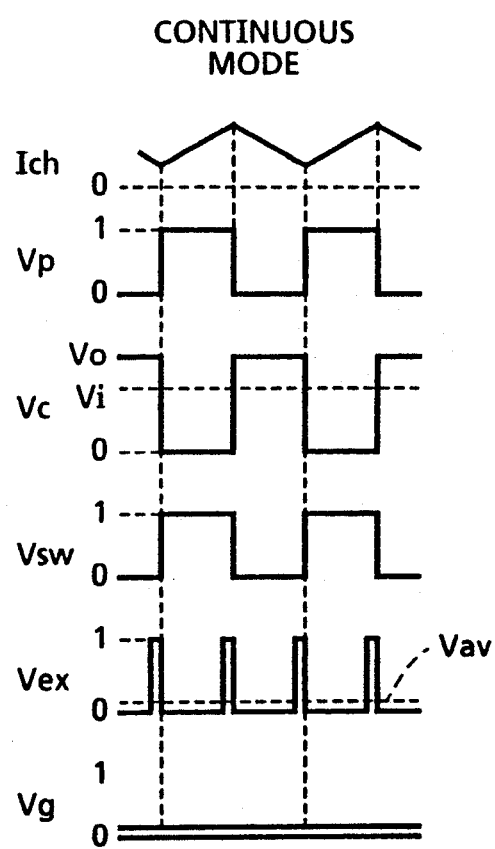
FIG. 3A — DISCONTINUOUS MODE
FIG. 3B — CONTINUOUS MODE

FIG. 5A
FIG. 5B
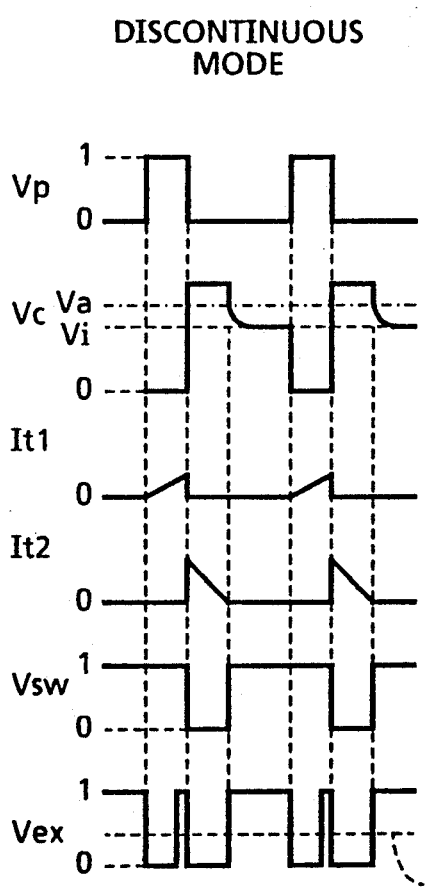
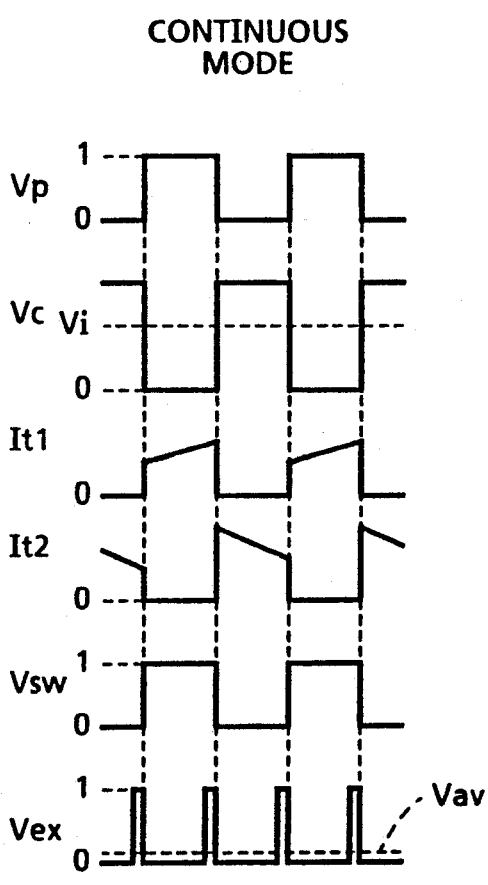

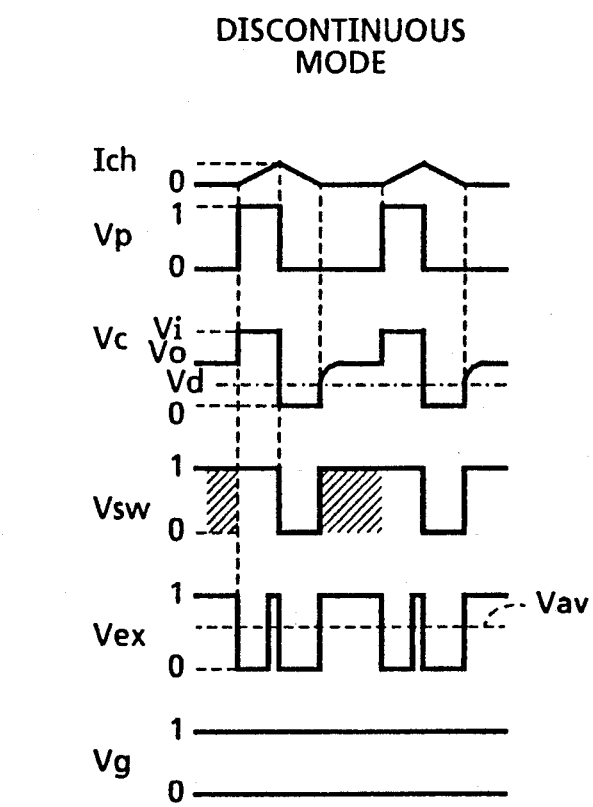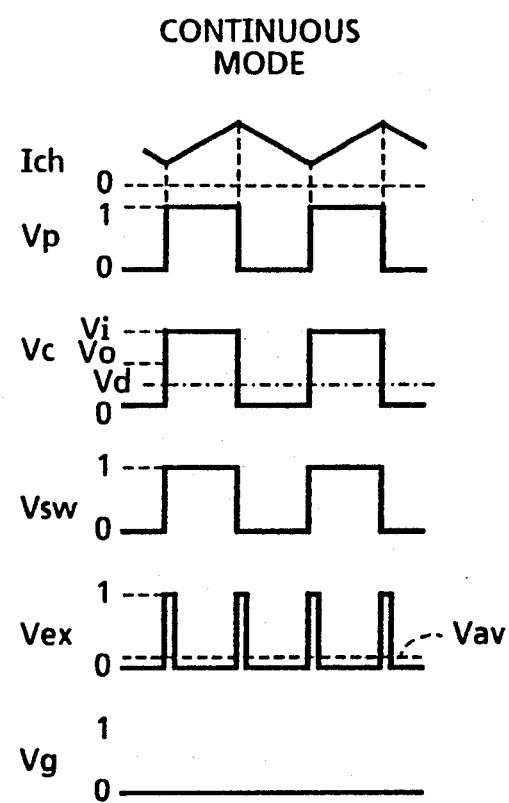

DISCONTINUOUS MODE

CONTINUOUS MODE

DISCONTINUOUS MODE

CONTINUOUS MODE

DISCONTINUOUS MODE

CONTINUOUS MODE

SWITCHING REGULATOR OPERATING IN A CONTINUOUS AND DISCONTINUOUS MODE

BACKGROUND OF THE INVENTION

1. Field of the Invention

This invention relates to a step up type, step down type, and flyback type switching regulators and more particularly to a switching regulator where an operating mode is detected to control the loop gain in accordance with the operating mode.

2. Prior Art

FIG. 10 shows a conventional chopper type switching regulator of a step up configuration where the output voltage is higher than the input voltage. FIG. 11 is a waveform diagram showing the behavior of the significant waveforms at different points of the circuit shown in FIG. 10. FIGS. 12A and 12B show the waveforms at different points of the circuit shown FIG. 10 in an discontinuous mode and in an continuous mode, respectively.

In FIG. 10, an error amplifier 8 amplifies the difference between the output voltage Vo and the reference voltage Vr of a reference voltage source 7 and outputs an error signal Ver as shown in FIG. 11. A reference oscillator 9 outputs a saw tooth signal Vosc as shown in FIG. 11. A PWM comparator 10 compares the error signal Ver with the signal Vosc to output a pulse-width modulated signal Vp which is fed to the base of a switching transistor 2. The comparator 10 outputs a logic "1" to turn on the transistor 2 when Vosc>Ver, and the comparator outputs a logic "0" to turn off the transistor 2 when Vosc<Ver. For example, if the output voltage Vo decreases due to an increase in load current, the error signal Ver decreases as depicted by a dotted line W1 in FIG. 11, so that the duty cycle of logic 1 of the signal Vp increases as depicted by W2 in FIG. 11. Thus, the transistor 2 remains on for a longer period. When the transistor 2 goes off, the electric energy stored both in a choke coil 3 and a capacitor 5 is superimposed to the energy supplied through an input terminal 1 and is directed to an output terminal 6, thereby increasing the output voltage Vo. This is the basic operation of the step up type regulator.

During switching operation, the circuit in FIG. 10 operates either in an discontinuous mode where the choke current Ich is intermittent, or in a continuous mode where the choke current exists at all times. The regulator operates in the discontinuous mode when the load is small, and in the continuous mode when the load is large.

In the discontinuous mode, for example, if the load current doubles, then the ON duty cycle of transistor 2 becomes twice to double the output power as depicted by dotted lines in FIG. 12A. The choke current Ich and collector current Itr of transistor 2 continues to increase for a longer period to increase so as to increase output power.

In the continuous mode, for example, if the load current doubles, the ON duty cycle increases only by a small amount as depicted by dotted lines in FIG. 12B. The choke current Ich and collector current Itr of transistor 2 increase to increase output power.

FIG. 13 shows a conventional chopper type switching regulator of step down configuration where the output voltage is lower than the input voltage. FIG. 14 shows the waveforms at different points in the circuit of FIG. 13. If Vosc>Ver, the pulse-width modulated signal Vp goes high. The high level of Vp turns on the transistor 12 which in turn causes the transistor 2A to turn on. If Vosc<Ver, the signal Vp goes low. The low level of Vp turns off the transistor 12 which in turn causes the transistor 2A to turn off. For example, if the output voltage Vo decreases due to an increase in load current, the error signal Ver decreases as depicted by a dotted line W1 in FIG. 11, so that the duty cycle of logic 1 of the signal Vp increases as depicted by W2 in FIG. 11. Thus, the transistor 12 remains on for a longer period. A longer ON period of the transistor 12 causes more electric energy to be stored across the choke coil 3 and the capacitor 5, thereby increasing the output voltage Vo. This is the basic operation of the step down type regulator.

With the aforementioned conventional step up type and step down type regulators where a regulated power supply has a capacitive load connected to the output of a negative feedback amplifier, the ON duty cycle of switching transistor must vary more greatly in the discontinuous mode than in the continuous mode in order to increase a given amount of output power. In addition, the loop gain becomes much higher when the regulator operates in the continuous mode than in the discontinuous mode. Experiment showed that the loop gain usually differs by a factor of more than ten.

In order to maintain as constant a output voltage as possible against changes in load and changes in input voltage, the loop gain should be as high as possible. Thus, the error amplifier usually has a high loop gain in a low frequency range. However, a higher loop gain causes phase delay both in the error amplifier and in the output capacitor within a feedback loop, which makes it difficult to simultaneously achieve good stability both in the continuous mode and in the discontinuous mode. This is disadvantageous to ensure good loop stability if loop gain varies greatly due to changes in mode. Conversely, improving feedback stability usually results in a lower loop gain in a high frequency range which in turn results in an increase in output resistance of the regulator. Then, the higher output resistance causes a large change in output voltage if the load changes quickly.

In order to prevent deterioration in stability and performance of feedback loop due to switching between modes, the regulator may be operated only in one mode. In this case, both stability and performance may be satisfied if changes in load and in input voltage are small. However, if changes in load and in input voltage are large, an extremely large capacitance of the output capacitor is required to reduce output resistance in the discontinuous mode. On the other hand, operating only in the continuous mode results in less peak currents and less ripple currents through the choke coil and output capacitor, being advantageous in reducing the size of choke coil. In this case, however, even when the load current is negligibly small, an unnecessary idling current must be drawn in order to prevent transition from continuous mode to discontinuous mode.

SUMMARY OF THE INVENTION

An object of the invention is to provide a switching regulator where large changes both in load and in input voltage are allowed and the feedback loop is stable irrespective of the operating mode. The present invention is to compensate for the decrease in loop gain of a switching regulator in the discontinuous mode. The gain of error amplifier is switched between the continuous mode and the discontinuous mode so that the overall loop gain is substantially the same irrespective of the operating mode.

A switching regulator according to the present invention operates in the discontinuous mode or in the continuous mode depending on a magnitude of load current. A mode detector outputs a mode signal Vg indicative of whether the switching regulator is operating in the discontinuous mode or in the continuous mode. In accordance with the mode signal Vg, an error amplifier selectively operates with a first feedback ratio and a second feedback ratio so as to output an error signal Ver indicative of the variation of an output voltage of the regulator. The error signal Ver is supplied to a PWM comparator which in turn outputs a PWM signal in accordance with the error signal. The PWM signal drives a switching transistor to switch an input voltage of the switching regulator. In this manner, a substantially the same loop gain is maintained regardless of the operating mode.

BRIEF DESCRIPTION OF THE DRAWINGS

Features, and other objects of the invention will be more apparent from the description of the preferred embodiments with reference to the accompanying drawings in which:

FIGS. 3A and 3B show waveforms at various points in the circuit of FIG. 1 in the discontinuous mode and in the continuous mode, respectively;

FIGS. 5A and 5B show waveforms at various points in the circuit of FIG. 4 in the discontinuous mode and in the continuous mode, respectively;

FIGS. 7A and 7B show waveforms at various points in the circuit of FIG. 6 in the discontinuous mode and in the continuous mode, respectively;

DETAILED DESCRIPTION OF THE PREFERRED EMBODIMENTS

First embodiment

Figure 1:
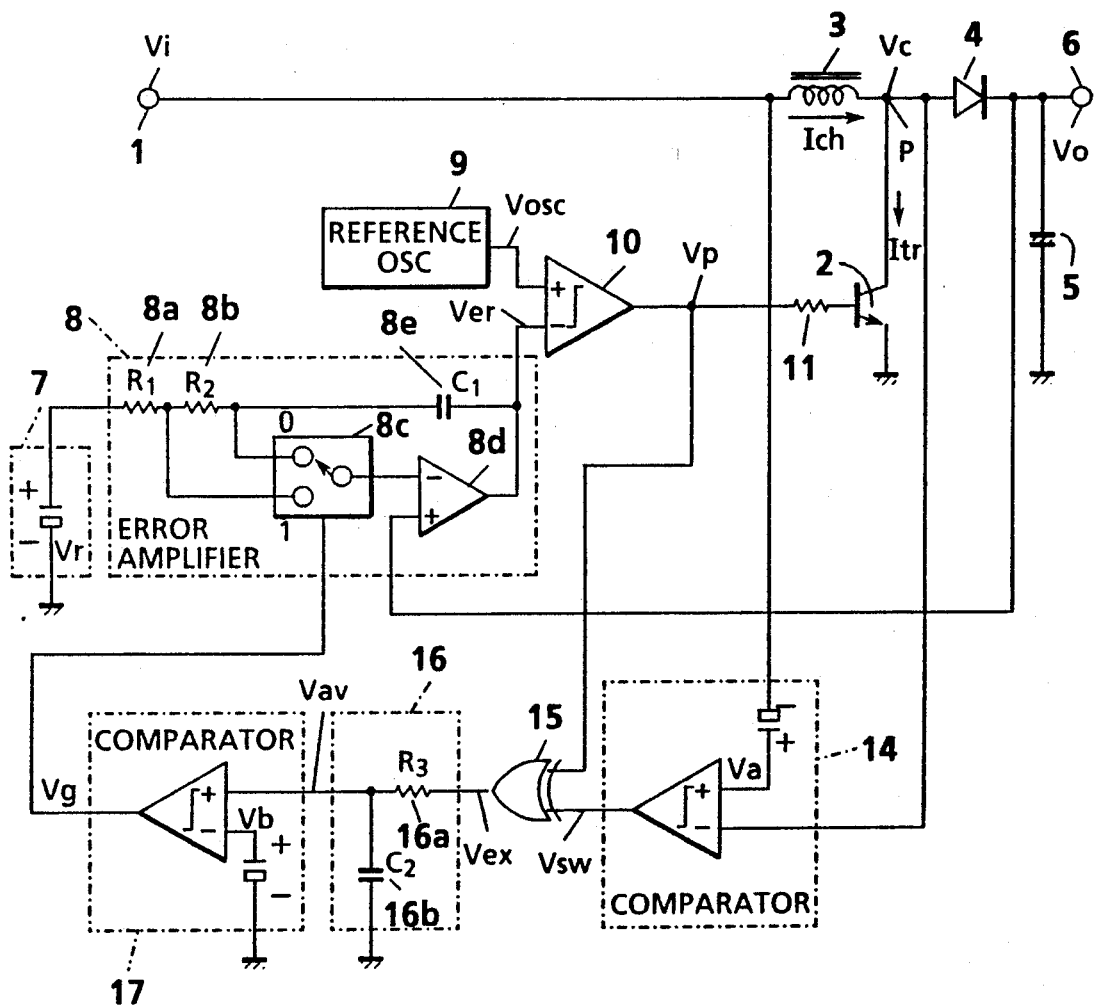
FIG. 1 shows a first embodiment of a step up type switching regulator according to the present invention.
Figure 2:
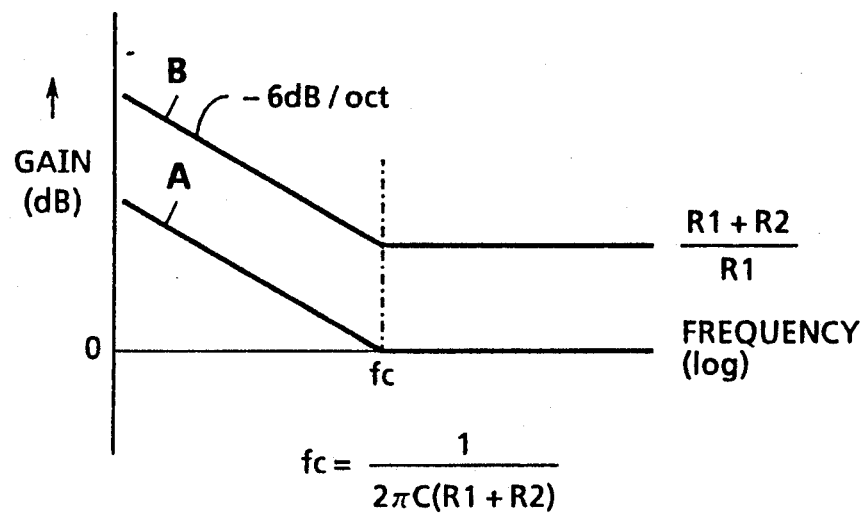
FIG. 2 shows characteristics of an error amplifier of the present invention.

FIG. 1 shows a first embodiment of a step up type switching regulator according to the present invention. FIG. 2 shows characteristics of an error amplifier of the present invention. FIG. 3 is a waveform diagram showing waveforms at various points of the circuit. In FIG. 1, a first comparator 14 has a non-inverted input terminal connected to an input terminal 1 via a built-in reference voltage, and an inverted input terminal connected to the collector of a switching transistor 2. The output signal Vsw of first comparator 14 is supplied to one of the input terminals of an Ex-OR gate 15. The EX-OR gate 15 receives the signal Vsw and the pulse-width modulated signal Vp and outputs a signal Vex to an averaging circuit 16 which takes the form of a simple CR low pass filter. The first comparator 14, EX-OR gate 15, and averaging circuit 16 as a whole detect the difference in the duty cycle of signal Vp between the two modes. Thus, the first comparator 14, EX-OR gate 15, averaging circuit 16, and comparator 17 operate as a mode detecting means.

The output of the averaging circuit 16 is directed to a second comparator 17 which compares its input with a built-in reference voltage to output a mode signal Vg which in turn drives a gain selector switch 8c. Resistors 8a and 8b, a capacitor C1, a differential amplifier 8d, and the gain selector switch 8c form an error amplifier 8. The gain selector switch 8c is positioned at "0" to provide an error amplifier characteristic A(lower gain) as shown in FIG. 2 when the mode signal Vg is a logic 0 (continuous mode), and is positioned at "1" to provide an error amplifier characteristic B(higher gain) as shown in FIG. 2 when the mode signal Vg is a logic 1 (discontinuous mode). The error amplifier characteristics A provide a first feedback ratio and B a second feedback ratio, so that the characteristic A provides a gain of error amplifier higher than the characteristic B. With the characteristic A, the gain decreases at a rate of −6 dB/oct up to a frequency fc and thereafter the gain remains constant at $(R1+R2)/R1$. With the characteristic B, the gain decreases at a rate of −6 dB/oct up to the frequency fc and thereafter the gain remains constant at 1 (i.e., zero dB). The error amplifier 8 outputs an error signal Ver on the basis of the output voltage Vo and a reference voltage Vr. A PWM comparator 10 receives a reference signal Vosc from a reference voltage source 7 and the error signal Ver, and compares the error signal Ver with the signal Vosc to output a pulse-width modulated signal Vp which in turn drives a switching transistor 2 to turn on and off.

The operation of the step up type regulator in FIG. 1 will now be described with reference to FIGS. 2 and 3. The first comparator 14 outputs the signal Vsw of a logic 1 if the voltage Vc is lower than a threshold level Va which is an algebraic sum of the input voltage Vi and the built-in voltage, and outputs a logic 0 if Vc>Va as shown in FIG. 3A.

In the discontinuous mode, the signal Vsw is a logic 1 (hatched portion in FIG. 3A) when the choke current Ich of a choke 3 is zero as well as when the signal Vp is a logic 1.

In the continuous mode, the choke current Ich is not zero at all times and the signal Vsw has substantially the same waveform as the signal Vp as shown in FIG. 3B.

The EX-OR gate 15 compares the signal Vsw with the signal Vp and outputs the signal Vex of a logic 0 if both the Vsw and Vp are of the same logic state, and outputs a logic 1 if the Vsw and Vp are of different logic states. The signal Vsw may be a logic 1 for very short periods both in the discontinuous mode and in the continuous mode. This is because the delay time in the circuit causes the signals Vp and Vsw to slightly differ in time during which they appear at the respective inputs of EX-OR 15. The signal Vex is then fed to the averaging circuit 16 where the signal Vex is averaged into a signal Vav, during which the aforementioned very narrow logic levels are removed. As shown together with Vex in FIGS. 3A and 3B, the signal Vav is almost zero in the continuous mode and is rather high in the discontinuous mode. The threshold level Vb of the second comparator 17 is selected to be slightly higher than the Vav in FIG. 3A so that the mode signal Vg of comparator 17 is a logic 1 in the discontinuous mode and a logic 0 in the continuous mode. In this manner, it is possible to accurately distinguish the discontinuous mode from the continuous mode. The signal Vg is then supplied to the gain selector switch 8c to control feedback ratio. when the mode signal Vg is a logic 1 (discontinuous mode), the gain selector switch 8c is shifted to the position "1" for higher gain, and when the mode signal Vg is a logic 0 (continuous mode), the switch 8c is shifted to the positioned "0" for lower gain. By selecting the gain characteristic of error amplifier 8 in this manner, substantially the same loop gain is maintained as a whole irrespective of the selected mode. This minimizes the variation in output of the regulator due to large changes in load as well as in input voltage and provides good loop stability. Switching the gain characteristic between the two modes is also advantageous in minimizing output variation as well as in ensuring the small size of regulator when a sudden drop in load current forces the regulator into the discontinuous mode from the continuous mode where the regulator is designed to normally operate.

Figure 3C:
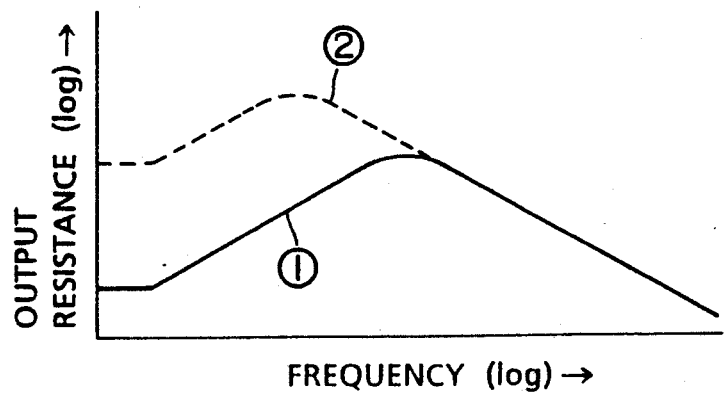
FIG. 3C shows the relationship between the output resistance of regulator and frequency of a switching regulator according to the invention.

The output resistance Ro of a switching regulator is given by a change in the output voltage Vo divided by a change in the load current Io. FIG. 3C shows the relationship between the output resistance of the regulator and frequency. Since the loop gain is decreased at higher frequencies for better stability, the output resistance Ro of the regulator increases with frequency in the low frequency since the impedance of output capacitor 5 decreases with frequency decreases with frequency in the high frequency range. Curve 1 in FIG. 3C shows the output resistance characteristic in the continuous mode as well as in the discontinuous mode when the gain of the error amplifier is increased as shown in FIG. 1. Curve 2 shows the output resistance in the discontinuous mode when the gain of the error amplifier is not increased in the discontinuous mode.

While the first embodiment has been described with respect to the step up type regulator, the aforementioned detection of operating mode may also be applied to other types of switching regulator as far as they operate both in a discontinuous mode and in a continuous mode.

Second embodiment

Figure 4:
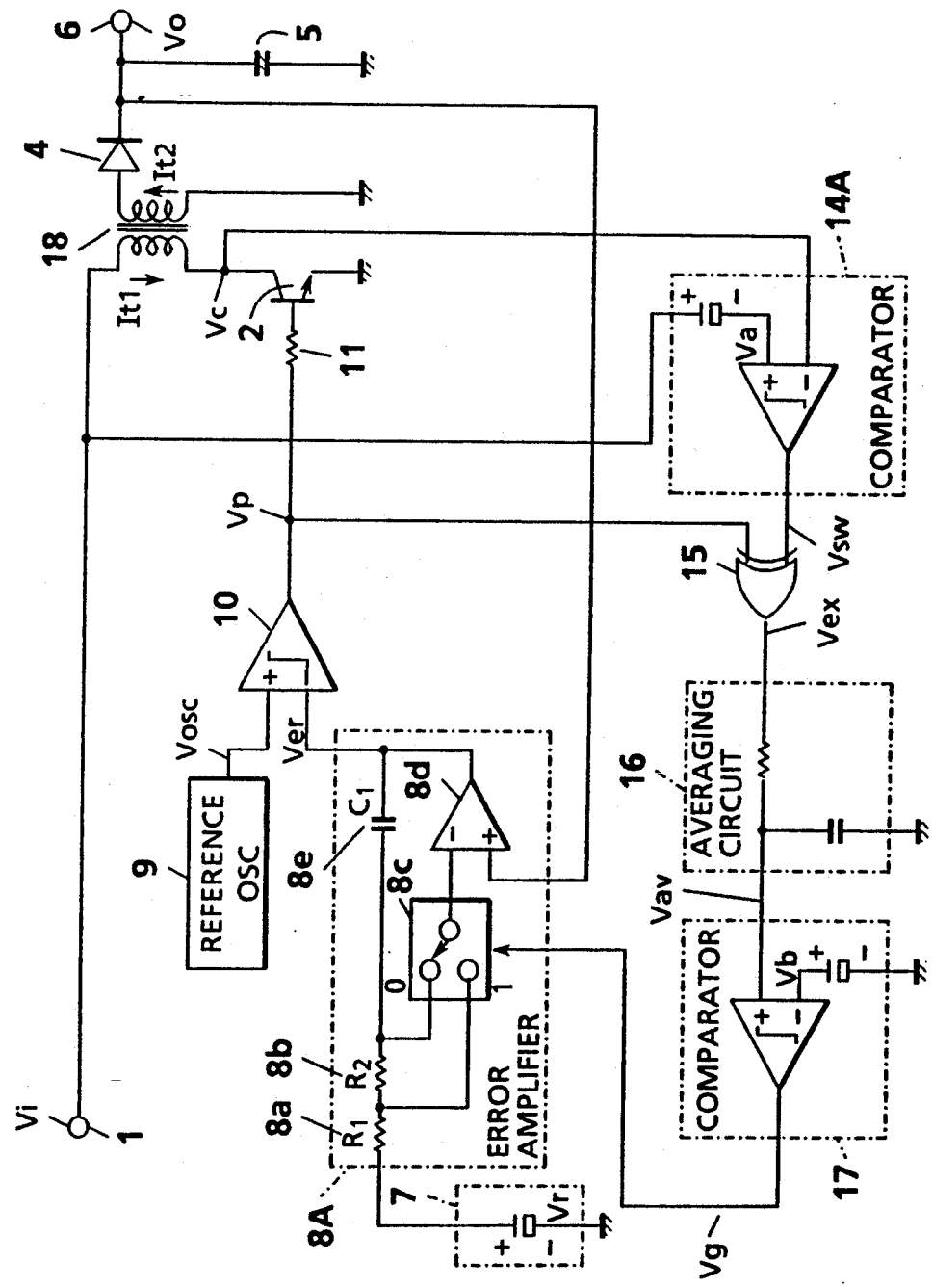
FIG. 4 shows a second embodiment where the first embodiment is modified into a flyback type switching regulator.

FIG. 4 shows a second embodiment where the first embodiment is modified into a flyback type switching regulator. A flyback type regulator uses a switching transformer 18 in place of the choke coil 3 in FIG. 1.

In FIG. 4, the primary winding of switching transformer 18 is inserted between the input terminal 1 and the collector of a switching transistor 2, and the secondary winding is connected between the ground and the anode of a diode 14. A first comparator 14A has a non-inverted input terminal connected to an input terminal 1 via a built-in reference voltage, and an inverted input terminal connected to the collector of switching transistor 2. The transformer 18 receives an electric power from the input terminal 1 through the primary winding to store a magnetic energy therein when the transistor 2 turns on, and discharges the stored magnetic energy through the secondary winding to a load when the transistor 2 turns off. The larger the ON duty cycle of the transistor 2 is, the larger the energy is supplied to the load.

FIGS. 5A and 5B show waveforms at various points in the circuit of FIG. 4 in the discontinuous mode and in the continuous mode, respectively. A voltage Vc at the collector of switching transistor 2 becomes zero volt when the pulse-width modulated signal Vp from the PWM comparator 10 goes high. When the signal Vp goes low, the transistor 2 turns off, and in the discontinuous mode the voltage Vc exceeds a threshold Va (shown in a dot-dash line together with Va in FIG. 5A), which is the sum of the input voltage Vi and a predetermined built-in-reference voltage, while the secondary current It2 is flowing. The voltage Vc then becomes the same as the input voltage Vi when the secondary current It2 becomes zero. In the continuous mode, the secondary current It2 continues to flow while the signal Vp is low, so that the voltage Vc is not equal to the voltage Vi at all times.

The first comparator 14, an EX-OR gate 15, an averaging circuit 16, a second comparator 17 operate in a similar manner to the step up type regulator in FIG. 1 so as to output a mode signal Vg which indicates whether the regulator is in the discontinuous mode or in the continuous mode. In this manner, the loop gain is optimized for the respective modes.

Third embodiment

Figure 6:
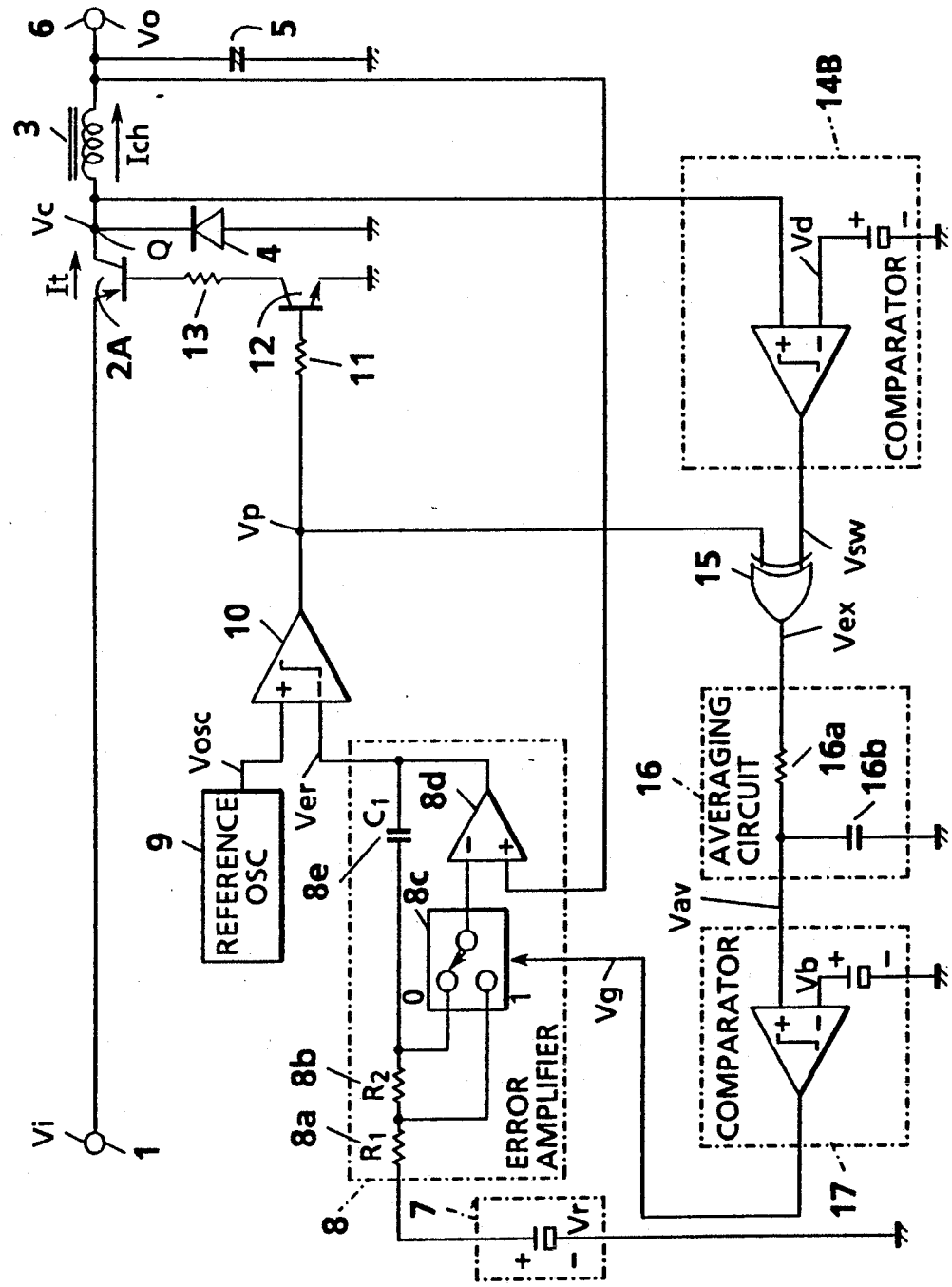
FIG. 6 shows a third embodiment which takes the form of a step down type regulator.
Figure 13:
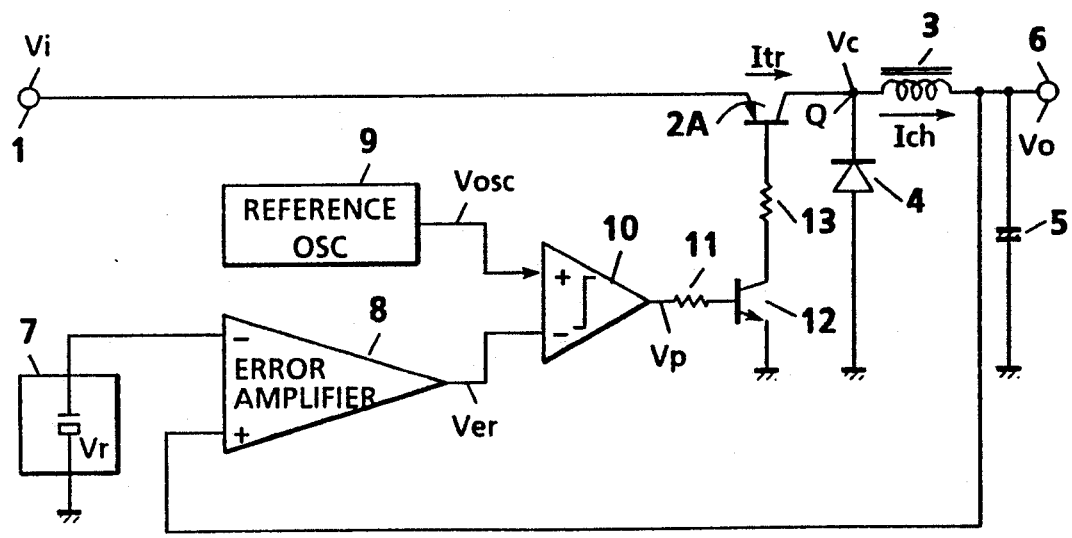
FIG. 13 shows a conventional chopper type switching regulator of a step down configuration where the output voltage is lower than the input voltage.
Figure 14A:
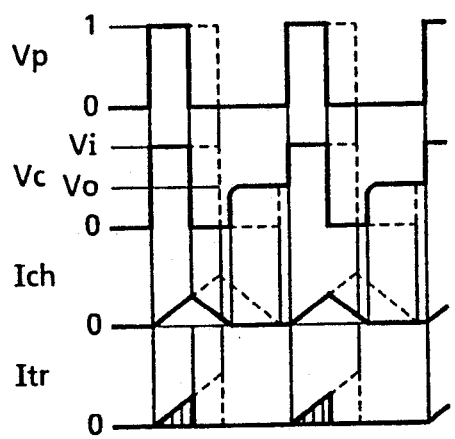
FIGS. 14A 14B show the waveforms at different points of the circuit of FIG. 13 in the discontinuous mode and in the continuous mode, respectively.
Figure 14B:
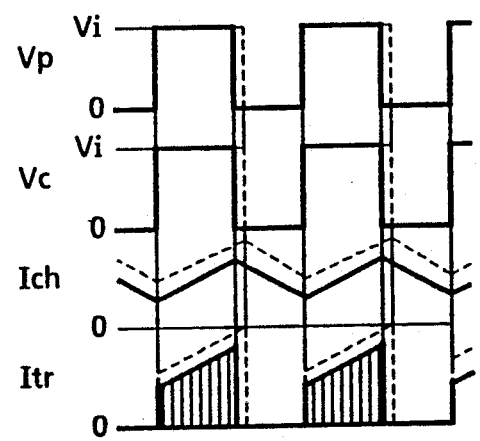

FIG. 6 shows a third embodiment which takes the form of a step down type regulator. Elements 1, 2A, 3, 5-7, 8, 9-12, and 15-17 are the same as those in FIGS. 1 and 13 and their descriptions have been omitted.

In FIG. 6, a first comparator 14B has a non-inverted input terminal connected to the collector of the switching transistor 2A and an inverted input terminal connected to the ground via a built-in reference voltage Vd.

FIGS. 7A and 7B show waveforms at various points in the circuit of FIG. 6 in the discontinuous mode and in the continuous mode, respectively.

The first comparator 14B has a threshold voltage Vd which is a voltage a predetermined value lower than the output voltage Vo. The first comparator 14B outputs a signal Vsw of a logic 1 during a period when the voltage Vc is greater than the threshold Vd. In the discontinuous mode, the signal Vsw is a logic 1 for a period when the choke current Ich is zero (hatched portion in FIG. 7A) and for a period when the pulse-width modulated signal Vp is a logic 0. In the continuous mode, the choke current Ich not zero at all times and the waveform of signal Vsw is much the same as that of the signal Vp.

Fourth Embodiment

Figure 8:
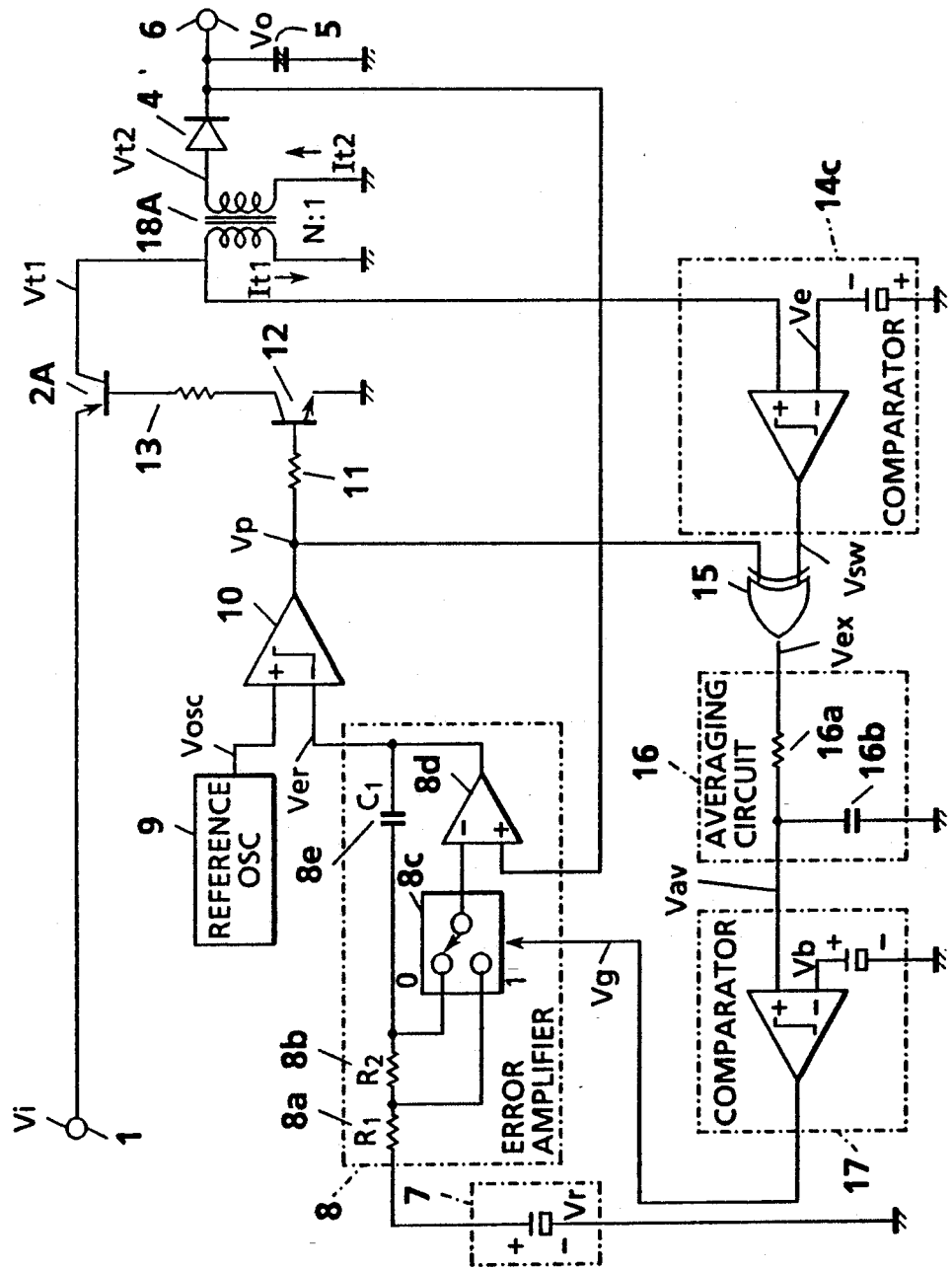
FIG. 8 shows a fourth embodiment where the third embodiment is modified into a flyback type switching regulator.

FIG. 8 shows a fourth embodiment where the third embodiment is modified into a flyback type switching regulator. This flyback type regulator uses a switching transformer 18A in place of the choke coil 3 in FIG. 6.

In FIG. 8, the primary winding of the switching transformer 18A is connected between the ground and the collector of a switching transistor 2A, and the secondary winding is connected between the ground and the anode of a diode 4. A first comparator 14C has a non-inverted input terminal connected to the collector of switching transistor 2A and an inverted input terminal connected to the ground via a built-in reference voltage.

The transformer 18A receives an electric power through the primary winding and stores a magnetic energy therein when the switching transistor 2A turns on, and discharges the magnetic energy to a capacitor 5 through the secondary winding when the transistor 2A turns off. The larger the ON duty cycle of the transistor 2 is, the larger the energy is supplied to a load side.

Figure 9A:
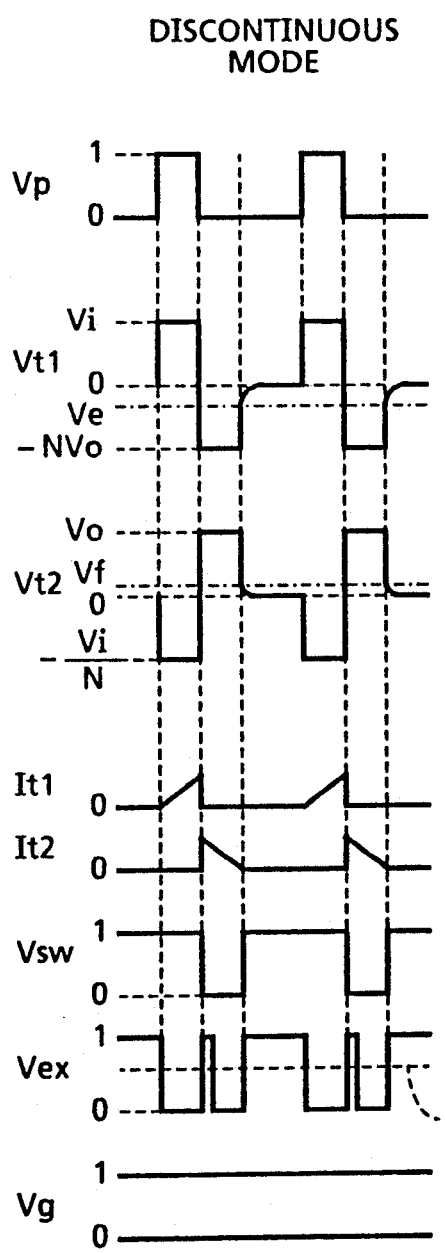
FIGS. 9A and 9B show waveforms at various points in the circuit of FIG. 8 in the discontinuous mode and in the continuous mode, respectively.
Figure 9B:
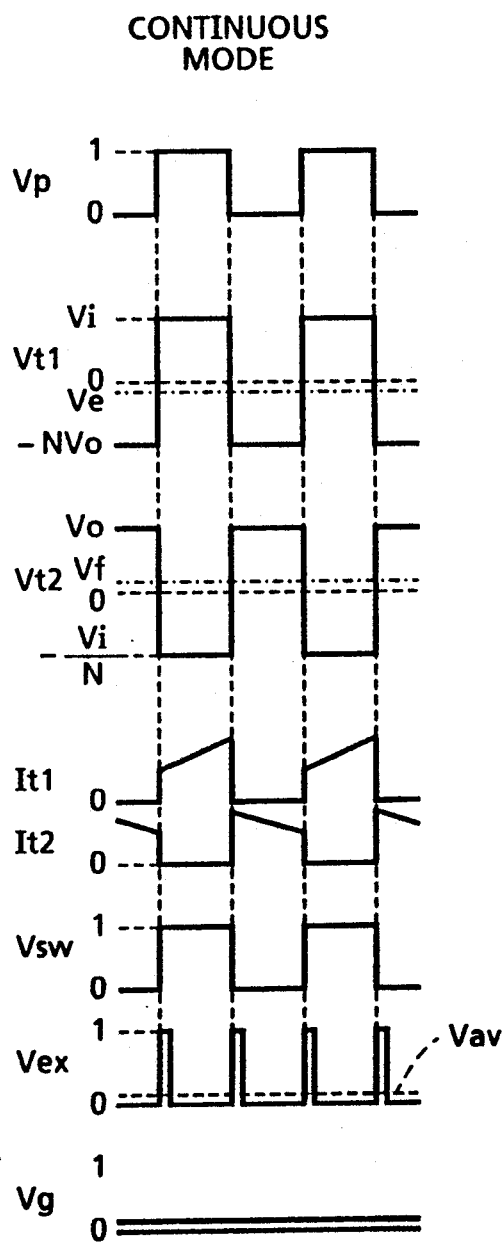
Figure 10:
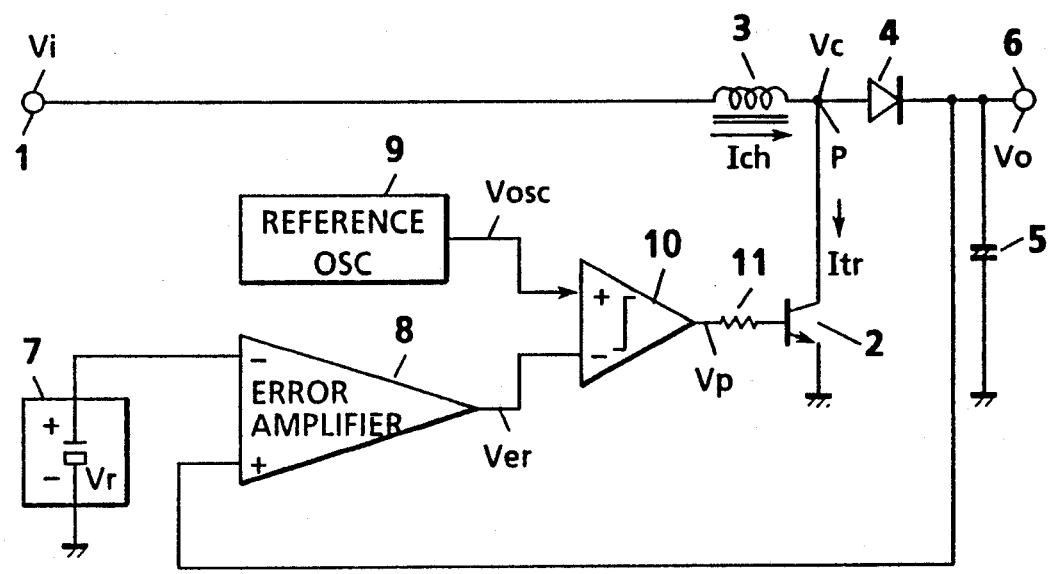
FIG. 10 shows a conventional chopper type switching regulator of a step up configuration where the output voltage is higher than the input voltage.

FIGS. 9A and 9B show waveforms at various points in the circuit of FIG. 8 in the discontinuous mode and in the continuous mode, respectively.

In the discontinuous mode, a voltage Vt1 at the collector of transistor 2 becomes equal to the input voltage Vi when the pulse-width modulated signal Vp is a logic 1, and becomes equal to $-NVo$ when the signal Vp is a logic 0 and the second current It2 flows. When the second current It2 becomes zero, the voltage Vt1 changes from $-NVo$ to zero volt.

In the continuous mode, the secondary current It2 continues to flow while the signal Vp is low, so that the voltage Vt1 does not become zero at all times.

The first comparator 14c outputs a signal Vsw of a logic 1 when the voltage Vt1 is greater than a predetermined threshold Ve. In this case, as shown in FIG. 9, the waveform of signal Vsw is substantially the same as that of the signal Vp in the continuous mode but is different in the discontinuous mode where the signal Vsw is a logic 1 when the voltage Vt1 is substantially zero volt.

The voltage Vt1, which is the primary voltage of transformer 18A, is analogous to the voltage Vt2 but opposite in polarity. The voltage Vt2 may be applied to the first comparator 14c instead of Vt1 providing that the first comparator 14C is arranged to output the signal Vsw of a logic 1 when Vt2 is less than a threshold Ve.

Although the loop gains of the above first to fourth embodiments are switched between the discontinuous mode and the continuous mode by switching between the two feedback ratios of the error amplifier 8, the loop gain may also be switched by other means. For example, a gain selecting circuit following the error amplifier 8 may be inserted in the circuit. Switching regulators are usually controlled their output power on the PWM principle. The loop gain may also be selected by changing the sensitivity of a PWM comparator where the output Ver of an error amplifier 8 is pulse width modulated.

Figure 11:
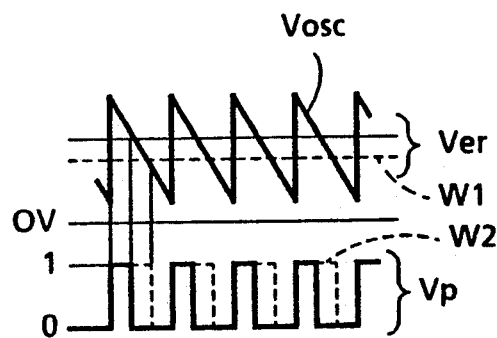
FIG. 11 is a waveform diagram showing the behavior of the most significant waveforms at different points of a PWM comparator.
Figure 12A:
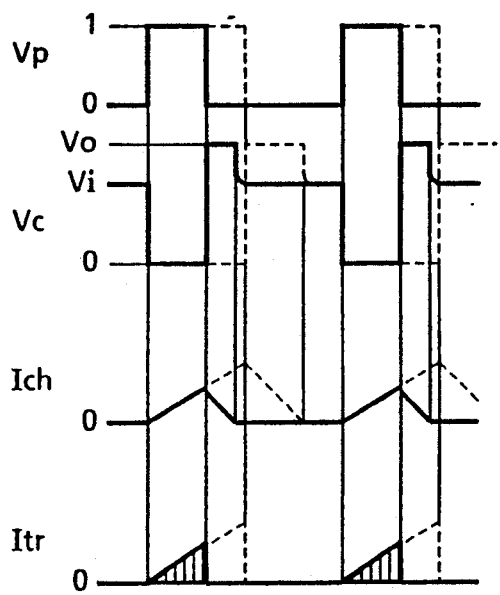
FIGS. 12A and 12B show the waveforms at different points of the circuit shown FIG. 10 in the discontinuous mode and in the continuous mode, respectively.
Figure 12B:
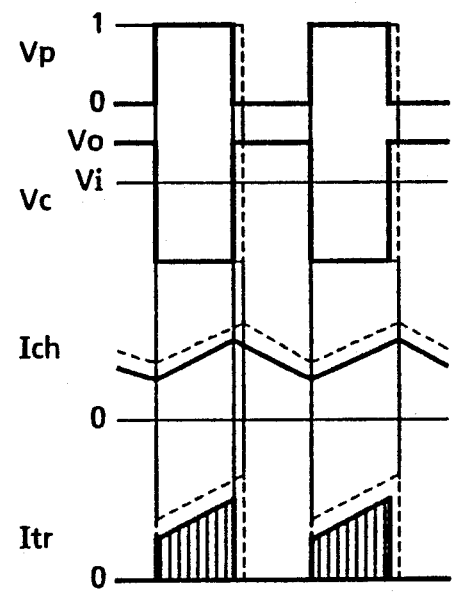

In FIG. 11, the reference oscillator 9 may be arranged to provide two kinds of magnitudes, a high magnitude and a low magnitude so that the higher Vosc provides a greater pulse width. If the signal Vosc is of an ideal saw tooth signal, when the signal Vosc becomes N times greater, the loop gain becomes 1/N. Therefore, selecting the amplitude of signal Vosc permits the selection of loop gain depending on the operating mode.

Industrial Applicability

The loop gain of a switching regulator is optimized both in the discontinuous mode and in the continuous mode. While exploiting the merit of the continuous mode where a smaller choke coil and a transformer will suffice, good stability of feedback loop is ensured for the respective modes. A large output capacitor is not needed for the discontinuous mode, which is advantageous in reducing the physical size of a switching regulator. Further, a switching regulator is provided which allows large variations in load and in input voltage and has good conversion efficiency.

What is claimed is:

1. A switching regulator operating either in an discontinuous mode or in an continuous mode depending on a magnitude of load current, comprising:
   mode detecting means for outputting a mode signal indicative of whether the switching regulator is operating in the discontinuous mode or in the continuous mode;
   an error amplifier operating with a first feedback ratio when said mode signal indicates the discontinuous mode and with a second feedback ratio when said mode signal indicates the continuous mode, said error amplifier outputting an error signal indicative of variation of an output voltage of said regulator;
   pulse-width modulating means for outputting a pulse-width modulated signal in accordance with said error signal; and
   switching means driven by said pulse-width modulated signal for switching an input voltage of said switching regulator.

2. A switching regulator according to claim 1, wherein said mode detecting means includes:
   a first comparator for comparing the output of said switching means with a first reference level to output a first output;
   an EX-OR gate for outputting an EX-ORed output based on the output of said pulse-width modulating means and the first output;
   an averaging circuit for averaging the EX-ORed output to output an averaged output; and
   a second comparator means for outputting said mode signal based on the averaged output and a second reference level.

3. A switching regulator according to claim 1, wherein said error amplifier comprising:
   a differential amplifier having a non-inverted input terminal to which said output voltage is supplied, an inverted input terminal, and an output terminal;
   a third reference voltage;
   a switch having a common terminal connected to said inverted input terminal, a first position, and a second position, said switch being switched to the first position when the regulator is in the continuous mode and to the second position when the regulator is in the discontinuous mode;
   a capacitor connected between said output terminal and said second position;
   a first resistor connected between the first position and the second position;
   a second resistor connected between the first position and the third reference voltage.

4. A switching regulator according to claim 2, wherein said averaging circuit is a CR filter.

5. A switching regulator according to claim 1, wherein said regulator is of a step up type.

6. A switching regulator according to claim 1, wherein said regulator is of a step down type.

7. A switching regulator according to claim 1, wherein said regulator is of a flyback type.

* * * * *